(12) United States Patent
Wegener et al.

(10) Patent No.: US 12,201,255 B2
(45) Date of Patent: Jan. 21, 2025

(54) WATER-CONDUCTING DOMESTIC APPLIANCE COMPRISING A SWITCHABLE AUTOMATIC OR MANUAL DOOR-OPENING ASSEMBLY

(71) Applicant: Miele & Cie. KG, Guetersloh (DE)

(72) Inventors: Dirk Wegener, Bielefeld (DE); Volker Marks, Bielefeld (DE); Guenter Kroeger, Rahden (DE)

(73) Assignee: MIELE & CIE. KG, Guetersloh (DE)

( * ) Notice: Subject to any disclaimer, the term of this patent is extended or adjusted under 35 U.S.C. 154(b) by 222 days.

(21) Appl. No.: 17/802,546

(22) PCT Filed: Feb. 23, 2021

(86) PCT No.: PCT/EP2021/054399
§ 371 (c)(1),
(2) Date: Aug. 26, 2022

(87) PCT Pub. No.: WO2021/175651
PCT Pub. Date: Sep. 10, 2021

(65) Prior Publication Data
US 2023/0084696 A1    Mar. 16, 2023

(30) Foreign Application Priority Data

Mar. 2, 2020 (DE) ..................... 10 2020 105 533.1
Mar. 20, 2020 (DE) ..................... 10 2020 107 758.0
Apr. 3, 2020 (DE) ..................... 10 2020 109 318.7

(51) Int. Cl.
*A47L 15/42* (2006.01)
*E05F 15/00* (2015.01)
*F16D 41/069* (2006.01)

(52) U.S. Cl.
CPC .......... *A47L 15/4261* (2013.01); *E05F 15/00* (2013.01); *E05Y 2201/216* (2013.01);
(Continued)

(58) Field of Classification Search
CPC ............. A47L 15/4257; A47L 15/4259; A47L 15/4261
See application file for complete search history.

(56) References Cited

U.S. PATENT DOCUMENTS

2012/0066975 A1* 3/2012 Hayakawa ............... F16D 43/14
49/324
2015/0354261 A1* 12/2015 Dora ....................... E05F 15/70
49/31
(Continued)

FOREIGN PATENT DOCUMENTS

CN       110279377 A     9/2019
DE    102017218501 A1    4/2019
(Continued)

OTHER PUBLICATIONS

EP-2578134-A2 Machine Translation (Year: 2013).*

*Primary Examiner* — Spencer E. Bell
(74) *Attorney, Agent, or Firm* — LEYDIG, VOIT & MAYER, LTD.

(57) ABSTRACT

A domestic appliance includes: an appliance housing which provides an appliance compartment and has a loading opening for access to the appliance compartment; an appliance door mounted so as to be rotatable about a pivot axis for closing the loading opening; a motor unit in operative connection with the appliance door and by which the appliance door is transferrable from an open position to a closed position closing the loading opening; and a clutch device arranged between the motor unit and the appliance door and in operative connection with the motor unit on a drive side thereof and with the appliance door on a driven side thereof. The clutch device has a clutch that is switchable and transferrable from a disengaged position to an engaged position and vice versa, the clutch causing an automatic (Continued)

switching from the disengaged position to the engaged position during operation of the motor unit.

15 Claims, 11 Drawing Sheets

(52) U.S. Cl.
CPC ..... *E05Y 2201/266* (2013.01); *E05Y 2201/43* (2013.01); *E05Y 2201/626* (2013.01); *E05Y 2201/654* (2013.01); *E05Y 2201/664* (2013.01); *E05Y 2400/3013* (2024.05); *E05Y 2900/304* (2013.01); *F16D 41/069* (2013.01)

(56) References Cited

U.S. PATENT DOCUMENTS

| | | |
|---|---|---|
| 2019/0040670 A1 | 2/2019 | Dora |
| 2019/0301230 A1 | 10/2019 | Spiessl et al. |
| 2020/0284083 A1 | 9/2020 | Köhler et al. |
| 2021/0025214 A1* | 1/2021 | Dora ................ E05F 1/1261 |

FOREIGN PATENT DOCUMENTS

| | | | |
|---|---|---|---|
| DE | 102018008895 A1 | 10/2019 | |
| EP | 0541974 A1 | 5/1993 | |
| EP | 2578134 A2 * | 4/2013 | ......... A47L 15/4259 |

* cited by examiner

WATER-CONDUCTING DOMESTIC APPLIANCE COMPRISING A SWITCHABLE AUTOMATIC OR MANUAL DOOR-OPENING ASSEMBLY

CROSS-REFERENCE TO PRIOR APPLICATIONS

This application is a U.S. National Phase application under 35 U.S.C. § 371 of International Application No. PCT/EP2021/054399, filed on Feb. 23, 2021, and claims benefit to German Patent Application No. DE 10 2020 105 533.1, filed on Mar. 2, 2020, DE 10 2020 107 758.0, filed on Mar. 20, 2020, and DE 10 2020 109 318.7, filed on Apr. 3, 2020. The International Application was published in German on Sep. 10, 2021 as WO 2021/175651 A1 under PCT Article 21(2).

FIELD

The invention relates to a domestic appliance, in particular to a water-conducting domestic appliance, such as a dishwasher, comprising an appliance housing which provides an appliance compartment and has a loading opening for access to the appliance compartment, comprising an appliance door mounted so that it can rotate about a pivot axis for closing the loading opening, comprising a motor unit which is in operative connection with the appliance door and by means of which the appliance door can be transferred from an open position to a closed position closing the loading opening, and comprising a clutch device which is arranged between the motor unit and the appliance door and is in operative connection with the motor unit on the drive side and with the appliance door on the driven side.

BACKGROUND

Domestic appliances in general and water-conducting domestic appliances in particular are well known per se from the prior art, which is why separate documents of proof are not required at this point. Reference is therefore made only to DE 10 2017 218 501 A1 as an example, which discloses a generic domestic appliance designed as a dishwasher.

A domestic appliance within the meaning of the invention is in particular a water-conducting domestic appliance, such as a dishwasher, a washing machine and/or a dryer. However, the term "domestic appliance" also includes refrigerators, ovens, steam cookers, microwaves and/or the like.

A generic domestic appliance has an appliance housing that provides an appliance compartment. The appliance housing has a loading opening so that the user can access the appliance compartment.

To close the loading opening when the domestic appliance is in use, an appliance door is provided, which is arranged on the appliance housing such that it can pivot about a pivot axis. When used as intended, the appliance door can be transferred by the user, from an open position to a closed position that closes the loading opening and vice versa. In the case of a water-conducting domestic appliance, the closure of the loading opening when the appliance door is in the closed position is preferably fluid-tight.

In order to simplify at least one pivoting movement of the appliance door from an open position to a closed position closing the loading opening, DE 10 2017 218 501 A1 discloses the use of a motor unit which is in operative connection with the appliance door. The motor unit allows the appliance door to be transferred from an open position to a closed position closing the loading opening after the user has previously activated the motor unit, and this without further manual intervention by the user.

The construction known from DE 10 2017 218 501 A1 also has anti-trap protection in the form of a clutch device which is arranged between the motor unit and the appliance door and is in operative connection with the motor unit on the drive side and with the appliance door on the driven side. This clutch device has a clutch that slips through in particular when a door limit resistance is exceeded and thus causes the appliance door and motor unit to be disengaged. Such a door limit resistance is achieved, for example, when an item is caught between the appliance housing and the appliance door, so that the clutch device reduces a possible risk of injury for the user. According to DE 10 2017 218 501 A1, a slip clutch or a separating clutch is preferably used as the clutch of the clutch device.

SUMMARY

In an embodiment, the present invention provides a domestic appliance, comprising: an appliance housing which provides an appliance compartment and has a loading opening for access to the appliance compartment; an appliance door mounted so as to be rotatable about a pivot axis for closing the loading opening; a motor unit in operative connection with the appliance door and by which the appliance door is transferrable from an open position to a closed position closing the loading opening; and a clutch device arranged between the motor unit and the appliance door and in operative connection with the motor unit on a drive side thereof and with the appliance door on a driven side thereof, wherein the clutch device has a clutch which is configured to be switchable and transferrable from a disengaged position to an engaged position and vice versa, the clutch being configured to cause an automatic switching from the disengaged position to the engaged position during operation of the motor unit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
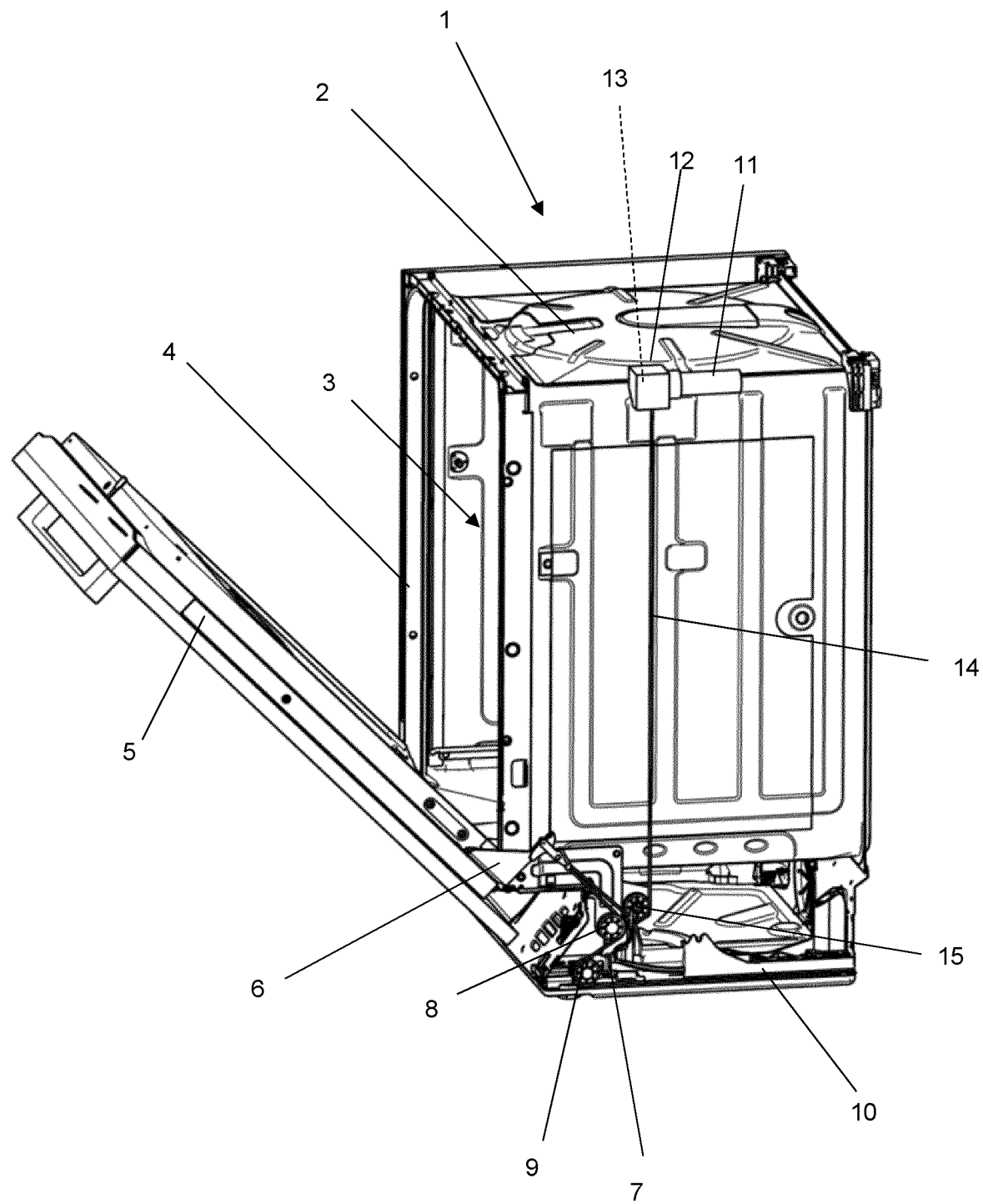
FIG. 1 is a schematic perspective representation of a domestic appliance according to the invention using the example of a domestic dishwasher, the appliance door being in a partially open position.

Although the construction previously known from DE 10 2017 218 501 A1 has proven itself in everyday practical use, there is a need for improvement. The previously known construction does not allow the user to choose between a manual and a motor-driven door closure. It is certainly not provided that manual assistance can be offered if the motor-driven door closure is too slow. An aspect of the present invention further develops a domestic appliance of the generic type in such a way that, in terms of design, the user is given freedom of choice for manual or motor-driven door closure.

In an embodiment, the present invention provides a domestic appliance which is characterized in that the clutch device has a clutch which is designed to be switchable and can be transferred from a disengaged position to an engaged position and vice versa, the clutch being adapted to cause an automatic switching from the disengaged position to the engaged position during operation of the motor unit.

The domestic appliance according to the invention has a clutch device having a clutch that is designed to be switchable. The clutch can be transferred from a disengaged position to an engaged position and vice versa. In the disengaged position, the operative connection between the motor unit and the appliance door is interrupted, which makes a manual actuation of the appliance door possible without excessive resistance caused by the motor unit. This is because, thanks to the decoupling, the motor unit does not turn as a result of manual pivoting of the appliance door.

However, if the clutch is in the engaged position, the operative connection between the motor unit and the appliance door is closed, so that the appliance door can be driven by the motor unit.

The embodiment according to the invention thus makes it possible, in contrast to DE 10 2017 218 501 A1, to be able to decide between manual door actuation on the one hand and motor-driven door actuation on the other.

According to the invention, it is also provided that the clutch is adapted to cause an automatic switching from the disengaged position to the engaged position during operation of the motor unit. The clutch provided with the clutch device therefore ensures an automatic switching of the clutch when the motor unit is activated, with said clutch being transferred from the disengaged position to the engaged position.

The clutch is therefore always in the disengaged position, which makes a manual door actuation possible. If, in particular, the appliance door is to be transferred to the closed position by motor-driven rather than manual activation, no separate switching of the clutch is required for this purpose. This is because it switches automatically, i.e., it is automatically transferred to the engaged position as soon as the motor unit is operational, i.e., the motor unit is started by the user.

This arrangement of the clutch according to the invention provides substantially two advantages. On the one hand, the option is created for the user to be able to distinguish between a manual and a motor-driven drive of the appliance door. In particular, it is possible to transfer the appliance door to the closed position thereof either manually or in a motor-driven manner. Furthermore, the clutch configuration according to the invention makes it possible that a motor-driven closing process of the appliance door is manually assisted, in particular, that it can be completed manually in order to accelerate the closing process. No further actuators are required to engage or disengage the clutch. It results solely from the intended operation of the motor unit.

The appliance doors of previously known domestic appliances are typically operated by hand, both with regard to opening and with regard to closing. It is desired that appliance doors can also be moved by motor, in particular for the purpose of closing. Sensors are provided on the device to trigger such motor operation, for example, so that a user can trigger motor operation with a simple movement of the hand or foot and thus initiate an automatic door closure, also in accordance with the previously known construction according to DE 10 2017 218 501 A1.

However, the previously known construction has the disadvantage that a manual door opening always has to take place against the motor force of the motor that is in operative connection with the appliance door. Even when the motor is at a standstill, the motor shaft must always be moved also, which requires a corresponding amount of force when opening it manually. The construction according to the invention provides a remedy for this, since the clutch is basically in the disengaged, i.e., released position, so that opening the door manually does not result in the motor shaft of the motor unit also rotating. When the appliance door is subsequently closed by motor power, the clutch is automatically engaged without any further action by the user, i.e., the clutch is transferred to the engaged position simply because of the motor rotating after previous activation. This allows simple handling by the user without additional actuators for the actuation of the clutch.

A feature according to the invention consists in particular in the fact that the clutch only engages when the motor unit is in rotary motion. It is therefore a kind of free-wheel clutch. When manual operation is taking place, i.e., the motor unit is not active, the clutch is not engaged, so that a motor-disengaged operation is possible. However, as soon as the user decides to switch on motor operation, the clutch engages so that motorized movement then takes place.

According to a further feature of the invention, it is provided that the operative connection between the motor unit and the appliance door has a force transmission means. Such a force transmission means allows motor-assisted closing and/or opening of the appliance door.

According to one embodiment of the invention, it is provided that the operative connection between the motor unit and the appliance door has a cord as the force transmission means. Such a cord allows motor-assisted closing of the appliance door. A motor-driven transfer of the appliance door to an open position is not provided according to this embodiment. The appliance door must therefore be opened manually, with the appliance door then being closed either manually or motor-driven.

Instead of a cord, a toothed belt or a chain, for example a roller chain or a ball chain, may also be provided as the force transmission means. In this case, the force transmission means can therefore be designed as a traction means acting in a form-fitting manner.

According to a further feature of the invention, it is provided that the force transmission means, for example the cord, is arranged at one end on a lever of the appliance door. During operation of the motor unit, the force transmission means, in particular the cord, is subjected to tensile stress. Since the force transmission means, in particular the cord, is arranged at one end on a lever of the appliance door, this generates a torque acting on the appliance door, namely around the pivot axis of the appliance door, which results in a motor-driven door movement, in particular in the door closure.

According to a further feature of the invention for the embodiment in which the force transmission means is designed as a cord, it is provided that the cord is arranged at the other end on a rotatably mounted drive means, namely on a cord drum, onto which the cord can be at least partially wound. When used as intended, the motor unit causes a rotating movement of the cord drum. This causes the cord to be wound onto the cord drum, with the cord being under tensile stress in the manner already described, so that the appliance door pivots. When the appliance door is opened manually, the cord is unwound from the cord drum, with a spring return element acting on the cord drum preferably being provided, so that the portion of the cord unwound from the cord drum is always under a certain pretension, so that, during operation of the motor unit, an immediate response of the appliance door is ensured.

Alternatively, the force transmission means arranged at one end on a lever of the appliance door, in particular if this is designed as a toothed belt or chain, can also be guided via a rotatably mounted drive means, for example a drive pulley or gear wheel, and fixed at the other end on a door spring which is used for weight compensation of the door in a manner known per se.

According to a further feature of the invention, it is provided that the motor unit is in operative connection with the drive means, such as the cord drum or the drive pulley, via the clutch device in order to cause the drive means to rotate during operation of the motor unit.

In the case of a purely manual actuation of the appliance door, the force transmission means is moved and the drive means is rotated without the motor shaft of the motor unit also rotating. In the case of a force transmission means designed as a cord, for example, in the case of a purely manual actuation of the appliance door, the cord is unwound from the cord drum when the door is opened and wound up again when the door is closed again, without the motor shaft of the motor unit also rotating. However, if the motor unit is started with the appliance door open, the clutch engages and a motor-driven rotation of the drive means, i.e., the cord drum or the drive pulley or gear wheel, takes place, with the result that the appliance door is transferred to the closed position by the motor. The cord is wound onto the cord drum when the appliance door is operated manually in that the cord drum is rotated back to the starting position thereof by the spring return means which is pretensioned as a result of a door opening.

According to a particular feature of the invention, it is provided that the clutch has a rotary part which is arranged on a motor shaft of the motor unit in a rotationally fixed manner and which carries a clamping piece arranged thereon so that it can rotate about a pivot axis. The clutch therefore has a rotary part. Said rotary part sits on the motor shaft of the motor unit in a rotationally fixed manner. In the case of a motor-driven rotating movement of the motor shaft, the rotary part is therefore also rotated, specifically about the axis of rotation of the motor unit provided by the motor shaft.

The rotary part also carries a clamping piece which is arranged on the rotary part so that it can rotate about a pivot axis. Two such clamping pieces are preferably provided. These can each rotate in relation to the rotary part, specifically in a radial direction in relation to the rotary part, from a retracted position to an extended position and vice versa.

According to a further feature of the invention, it is provided that the clamping piece, with an end portion remote from the pivot axis, interacts with a link guide provided by a guide means. During operation, this link guide of the guide means causes the interacting clamping piece to pivot in the radial direction relative to the rotary part. For this purpose, the clamping piece may have a pin engaging in the link guide of the guide means for this purpose in the end portion of said clamping piece remote from the pivot axis. If a rotating movement of the rotary part then occurs, the clamping piece rotates on the one hand together with the rotary part, specifically around the axis of rotation of the rotary part. At the same time, the clamping piece performs a pivoting movement about its own pivot axis in relation to the rotary part, specifically as a result of the guidance of the pin of the clamping piece, which pin is remote from the pivot axis, in the associated link guide of the guide means.

According to a further feature of the invention, it is provided that the guide means is rotatably mounted on a bearing collar through which the motor shaft projects, forming a friction fit.

The formation of the friction fit on the bearing collar ensures that the guide means does not rotate under friction when the rotary part rotates, but the clamping piece carried by the rotary part has not yet moved to the end position thereof in relation to the rotary part. Until this end position is reached, the guide means is stationary in relation to the rotary part, which allows the end portion of the clamping piece, which end portion is remote from the pivot axis, to be guided along the associated link guide.

As soon as the clamping piece is pivoted to the end position thereof in relation to the rotary part, it entrains the guide means, so that it rotates together with the rotary part upon the mechanical interposition of the clamping piece. In order to make this possible, the guide means is rotatably mounted on the bearing collar. The formation of the friction fit between the bearing collar and the guide means therefore does not prevent an entraining rotating movement of the guide means, but only ensures that a rotating movement of the clamping piece in relation to the rotary part takes place until the clamping piece has reached the end position thereof determined in correlation with the link guide.

According to a further feature of the invention, it is provided that the clutch has a clutch housing which at least partially receives the rotary part and has an inner contour interacting with the clamping piece. The rotary part is arranged at least in sections within a clutch housing. If the clamping piece is not pivoted in relation to the rotary part, the rotary part can be freely rotated relative to the clutch housing. A force transmission between the rotary part and the clutch housing therefore does not take place.

The clutch housing has an inner contour that interacts with the clamping piece. The clamping piece engages with the inner contour of the clutch housing as soon as the clamping piece has pivoted in relation to the rotary part and is in the extended end position thereof. In this position of the clamping piece, there is preferably a form fit between the clamping piece and the inner contour of the clutch housing, so that a torque transmission takes place from the rotary part to the clutch housing by means of the clamping piece. In this position of the clamping piece, the clutch is engaged, i.e. it is in the engaged position thereof, so that a force transmission can take place from the motor-driven rotary part to the clutch housing.

According to a further feature of the invention, it is provided that the inner contour has a receiving groove or receiving trough designed to correspond to the end portion of the clamping piece, which end portion is remote from the pivot axis. The clamping piece engages in this receiving groove, forming a form fit when the clamping piece has pivoted in relation to the rotary part and is in the end position thereof. As long as the clamping piece has not reached this position, the rotary part rotates relative to the clutch housing, so that no force transmission can take place from the motor unit to the clutch housing. Only when the clamping piece engages in a form-fitting manner in the associated receiving trough of the clutch housing, a frictional connection is established, so that an engine torque can be transmitted to the clutch housing.

According to a further feature of the invention, it is provided that the clutch housing provides a driven shaft. Said driven shaft is in operative connection with the drive means, for example the cord drum, so that, when the clutch is engaged, a motor drive of the drive means, in particular the cord drum, can take place.

The construction of the clutch described above allows automatic switching of the clutch to take place as soon as the motor unit starts up. This is because operation of the motor unit requires that the rotary part of the clutch rotates, which means that the clamping piece also rotates in relation to the rotary part. As soon as the rotary part is rotated by a certain angular amount about the axis of rotation of the motor unit provided by the motor shaft, the clamping piece reaches the end position thereof, which position is rotated relative to the rotary part, and engages with an associated receiving trough of the clutch housing. This results in a frictional connection, so that the motor-generated torque is transmitted to the clutch housing and thus to the drive shaft and finally to the drive means coupled thereto, in particular the cord drum.

If, despite the motor-driven closure of the appliance door, manual assistance is provided by the user manually pushing the appliance door, the clutch housing may rotate faster than the motor-driven rotary part, depending on the manual application of force. This then results in an automatic decoupling since the clamping piece received by a receiving trough is released by the receiving trough when the clutch housing rotates faster. A manual intervention on the part of the user does not result in a force being applied to the motor unit, but in automatic decoupling, since the form fit between the clamping piece and the clutch housing is cancelled if, due to manual intervention by the user, the clutch housing rotates faster, i.e., at a higher rotational speed, than the motor-driven rotary part of the clutch due to the manual intervention of the user. A "pushing" of the appliance door by the user is therefore secured by the embodiment according to the invention and does not result in damage either to the clutch or to the motor unit. The construction according to the invention thus proves to be robust and safe to handle in everyday practical use.

According to a further feature of the invention, it is provided that the clutch device has a second clutch which is designed as an overload clutch. This second clutch serves as an anti-trap protection, in particular for safety reasons, and prevents a door closure when the door is blocked.

According to a further feature of the invention, it is provided that the second clutch has a first clutch part and a second clutch part, the second clutch part bearing against the first clutch part under spring preload. Ordinarily, the two clutch parts are in operative connection, which is achieved by the first clutch part being designed to be stationary, and the second clutch part pressing in a spring-loaded manner against the first clutch part. During operation, the torque provided by the motor unit is transmitted from the first clutch part to the second clutch part, so that a force transmission from the motor unit to the drive means to be rotated, in particular the cord drum or drive pulley, can take place in the manner already described.

If the door is blocked, for example because a user's body part gets into the door space between the closing door on the one hand and the appliance housing on the other, the motor unit works against the resulting resistance. As soon as the resistance is too high, the spring preload on the clutch side is no longer sufficient to press the second clutch part against the first clutch part in a force-transmitting manner. When the force is interrupted, the clutch parts slip, which prevents the appliance door from being closed any further, with the result that getting caught in the door gap is reliably prevented.

According to a further feature of the invention, it is provided that the first clutch part is arranged on the driven shaft of the first clutch in a rotationally fixed manner. Accordingly, it is provided that first the first clutch and then the second clutch is connected to the motor unit. An alternative to this is a reversed arrangement, according to which first the second clutch and then the first clutch is connected to the motor unit.

The advantage of the first alternative embodiment is that the second clutch can be set much more sensitively and the resistance at which the second clutch slips can be specified much more precisely.

According to a further feature of the invention, the second clutch is a claw clutch.

The embodiment according to the invention proves overall to be simple in construction, robust in use, and space-saving in construction. No additional actuators are necessary for engaging and/or disengaging the first clutch. In the released state of the first clutch, manual operation of the appliance door is possible without restrictions and without increased effort. In addition, the construction according to the invention allows high torques to be transmitted, which makes a secure door closure possible.

The operating modes "blocking the door" on the one hand and "pushing the door by a user" on the other hand, which are to be classified as special cases in comparison to normal operation, are secured with the construction according to the invention. Thus, in the event of a blockage, an overload clutch, in particular a claw clutch, is preferably provided, which ensures slipping if the door resistance is too high, with the result that the force transmission from the motor unit to the appliance door is interrupted. The operating case in which the appliance door is "pushed" by the user during motor operation is secured by the first clutch itself, since the clutch housing can be rotated freely relative to the rotary part in the winding direction of the cord drum. In this respect, too, no additional components are required.

FIG. 1 is a schematic perspective representation of a domestic appliance according to the invention using the example of a domestic dishwasher 1.

The domestic dishwasher 1 has an outer housing which accommodates the appliance housing 2. The appliance housing 2 provides an appliance compartment 3 which is accessible via a loading opening 4.

Figure 2:
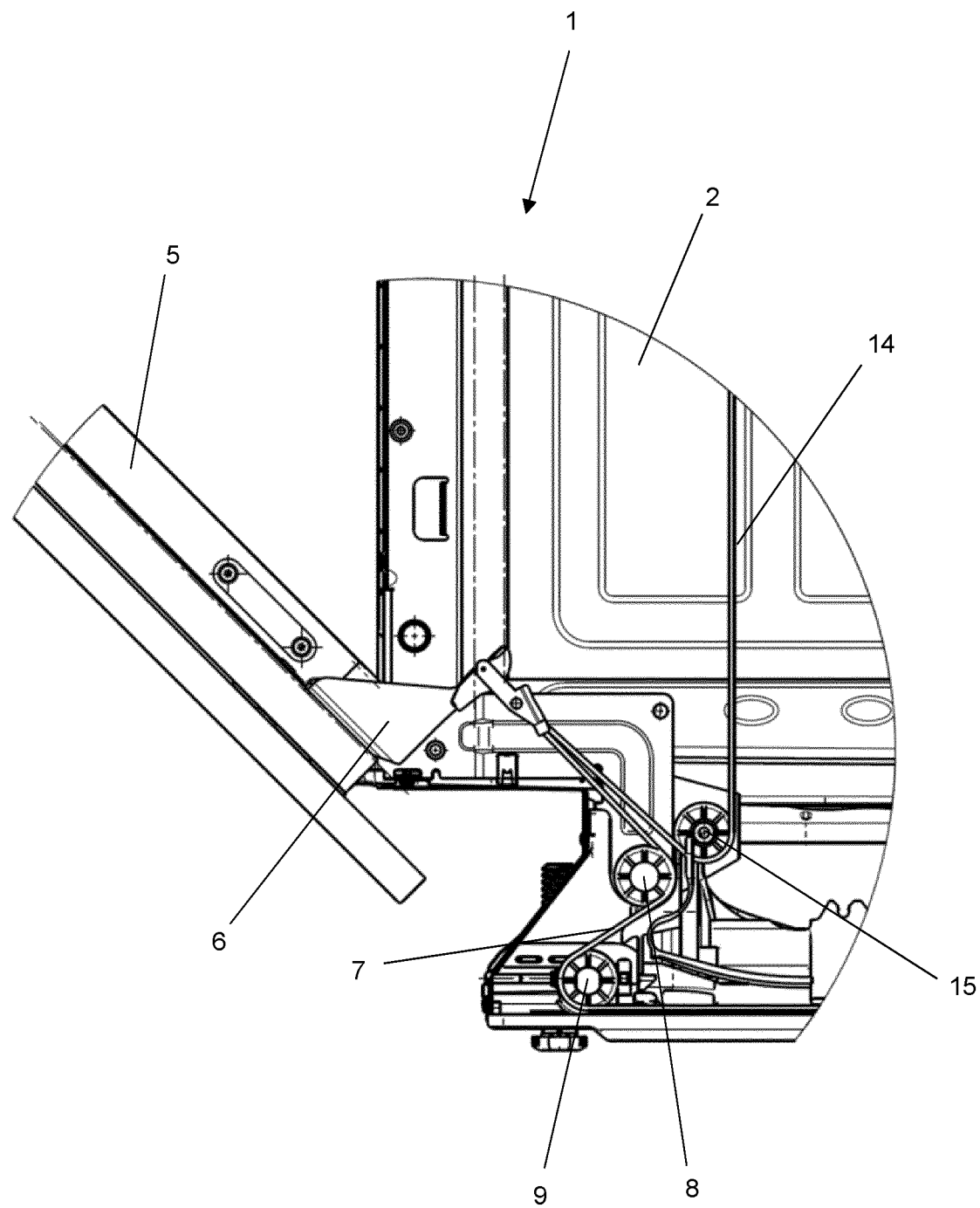
FIG. 2 is a detailed view of a section of the dishwasher according to FIG. 1.

The domestic dishwasher 1 also has an appliance door 5 which is mounted so that it can rotate about a pivot axis and which is used to close the loading opening 4. The appliance door 5 can be transferred from a closed position closing the loading opening 4 to an open position and vice versa. FIGS. 1 to 3 show the appliance door 5 in an open position in which the loading opening 4 is partially open.

As can be seen in particular from the detailed view of FIG. 3, the appliance door 5 has, close to the pivot axis, a lever 6 arranged thereon. One lever 6 is provided on each side of the appliance door 5.

In the embodiment according to FIGS. 1 and 2, a cord 7 is arranged at one end on the lever 6 in a manner known per se, which cord is guided over two deflection rollers 8 and 9 and is arranged at the other end on a spring element which is stationary relative to the appliance housing 2. This spring element is not shown in more detail in FIGS. 1 and 2 and is covered by a metal sheet 10.

In the case of a manual opening of the appliance door 5 by a user, the cord 7 arranged on the levers 6, respectively, is subjected to tension, which results in a tensioning of the spring element arranged on the corresponding cord 7 on the other end. This force stored in the spring element is released again when the appliance door is transferred to the closed position, which allows the appliance door 5 to be closed more easily. The construction of such a spring force support of the appliance door 5 is known per se from the prior art, even with only one spring element.

The domestic dishwasher 1 also has a motor unit 11 which is in operative connection with the appliance door 5 and by means of which the appliance door 5 can be transferred from an open position to a closed position closing the loading opening. For this purpose, in the embodiment of FIGS. 1 and 2, a further cord 14 is provided as the force transmission means, and a cord drum 13 received in a housing 12 is provided as the drive means, onto which cord drum the cord 14 can be at least partially wound.

As can be seen from FIGS. 1 and 2, the further cord 14 is arranged at one end on a lever 6 of the appliance door 5. Starting from the lever 6, the further cord 14 is guided around a deflection roller 15 up to the cord drum 13 with which the cord 14 is coupled at the other end. During a rotating movement of the cord drum 13 in the winding direction, the cord 14 is subjected to a tensile load, which not only causes the cord 14 to be wound onto the cord drum 13, but also causes a rotating movement of the appliance door 5 in the direction of the closed position.

A clutch device 16, which is described in more detail in FIGS. 4 to 22, is integrated into the operative connection between the motor unit 11 and the appliance door 5 and is in operative connection with the motor unit 11 on the drive side and with the appliance door 5 on the driven side. During operation of the motor unit 11, torque transmission takes place from the motor unit 11 to the appliance door 5 via the clutch device 16.

Figure 3A:
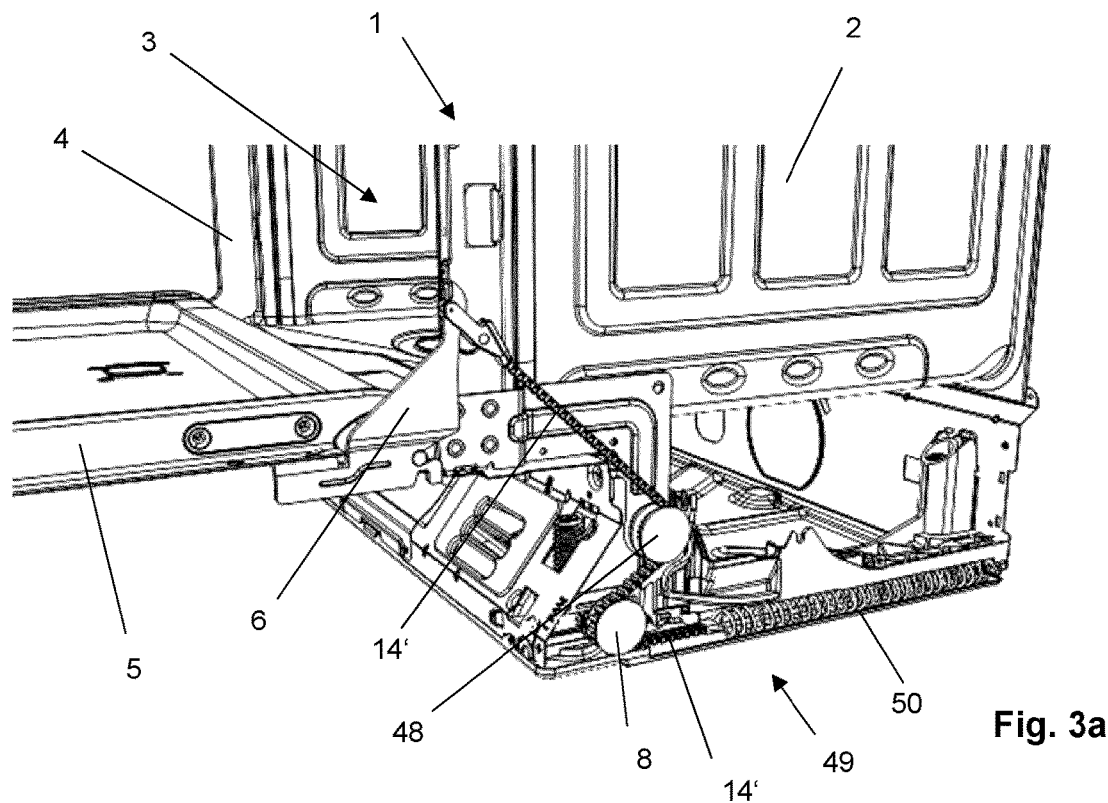
FIGS. 3a and 3b are detailed views of a section of a domestic appliance according to the invention using the example of a domestic dishwasher according to a second embodiment.
Figure 3B:
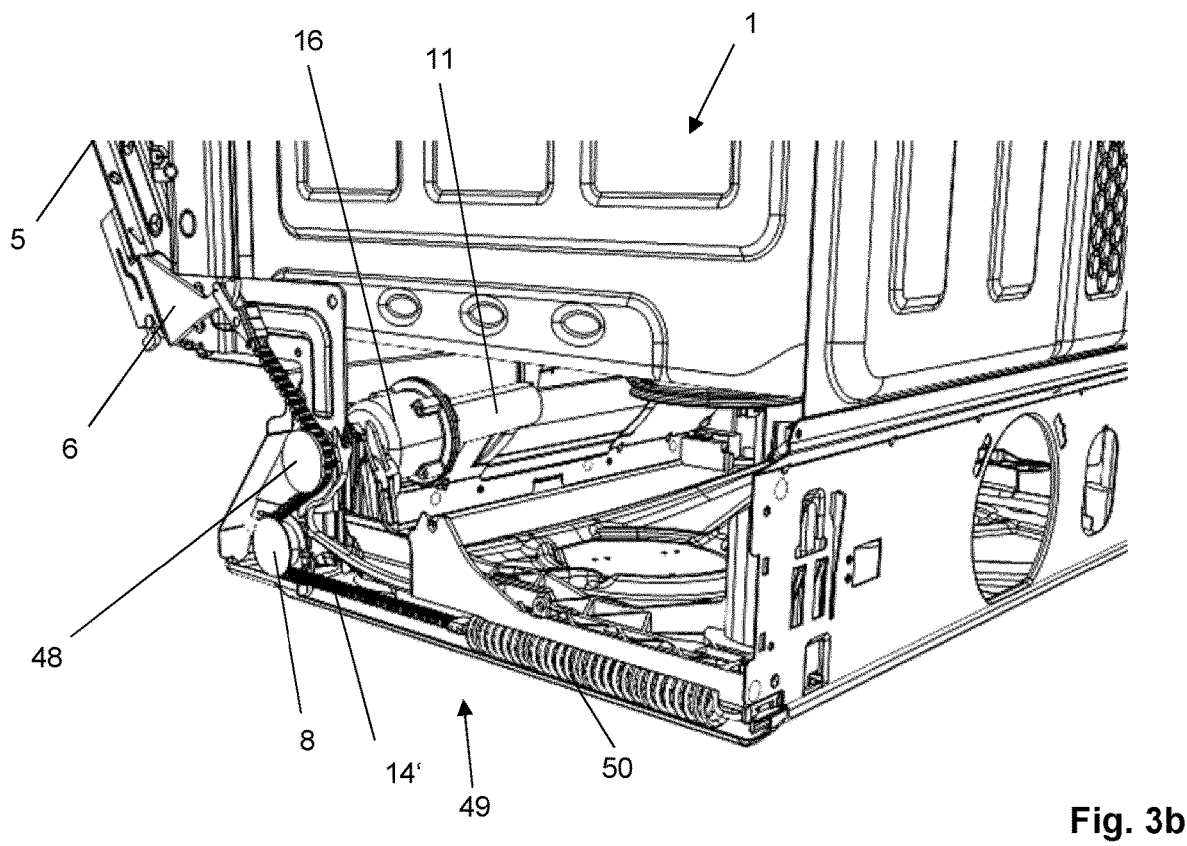

FIGS. 3a and 3b show a second embodiment alternative to FIGS. 1 and 2. Instead of the cord 14, a toothed belt 14' is used as the force transmission means. Said toothed belt is arranged at one end on the corresponding lever 6, is guided over a drive means designed as a gear wheel 48 and a deflection roller 8 and is arranged at the other end on a spring element 50 which is stationary relative to the appliance housing 2. In the drawings, this spring element 50 is at least partially covered by a metal sheet portion.

In the case of a manual opening of the appliance door 5 by a user, the toothed belt 14' arranged each of the levers 6 is subjected to tension in this embodiment, which results in tensioning of the spring element 50 arranged on the corresponding toothed belt 14' at the other end. There is a weight balance with respect to the appliance door 5, which prevents the appliance door 5 from pivoting down in an uncontrolled manner. The force stored in the spring elements 50 is released again when the appliance door 5 is transferred back to the closed position, which allows the appliance door 5 to be closed more easily. In their combination, the toothed belt 14' and the spring element 50 form the spring mechanism 49.

In this second embodiment, the motor unit 11, which is in operative connection with the appliance door 5 and allows motor-driven pivoting of the appliance door 5 from an open position to a closed position, can be arranged in the base region of the domestic dishwasher 1, for example, as shown in FIG. 3b. During operation of the motor unit 11, said motor unit drives the gear wheel 48 via a clutch device 16, which gear wheel is engaged in a form-fitting manner with the toothed belt 14'. A motor-driven rotation of the gear wheel 48 thus results in a tensile stress on the toothed belt 14', as a result of which force is applied to the appliance door 5 with the result that it rotates clockwise in the direction of the loading opening 4. Due to the form fit between the gear wheel 48 and the toothed belt 14', no slip can occur, so that the appliance door 5 can be moved safely and independently of the door weight and the door position over the entire pivoting range.

In FIGS. 4 to 20, the clutch device 16, which can be used both for the embodiment according to FIGS. 1 and 2 and for the embodiment according to FIGS. 3a and 3b, is described in more detail. According to the invention, said clutch device has a clutch 17 which is designed to be switchable and can be transferred from a disengaged position to an engaged position and vice versa, the clutch 17 being adapted to cause an automatic switching from the disengaged position to the engaged position during operation of the motor unit 11.

Figure 4:
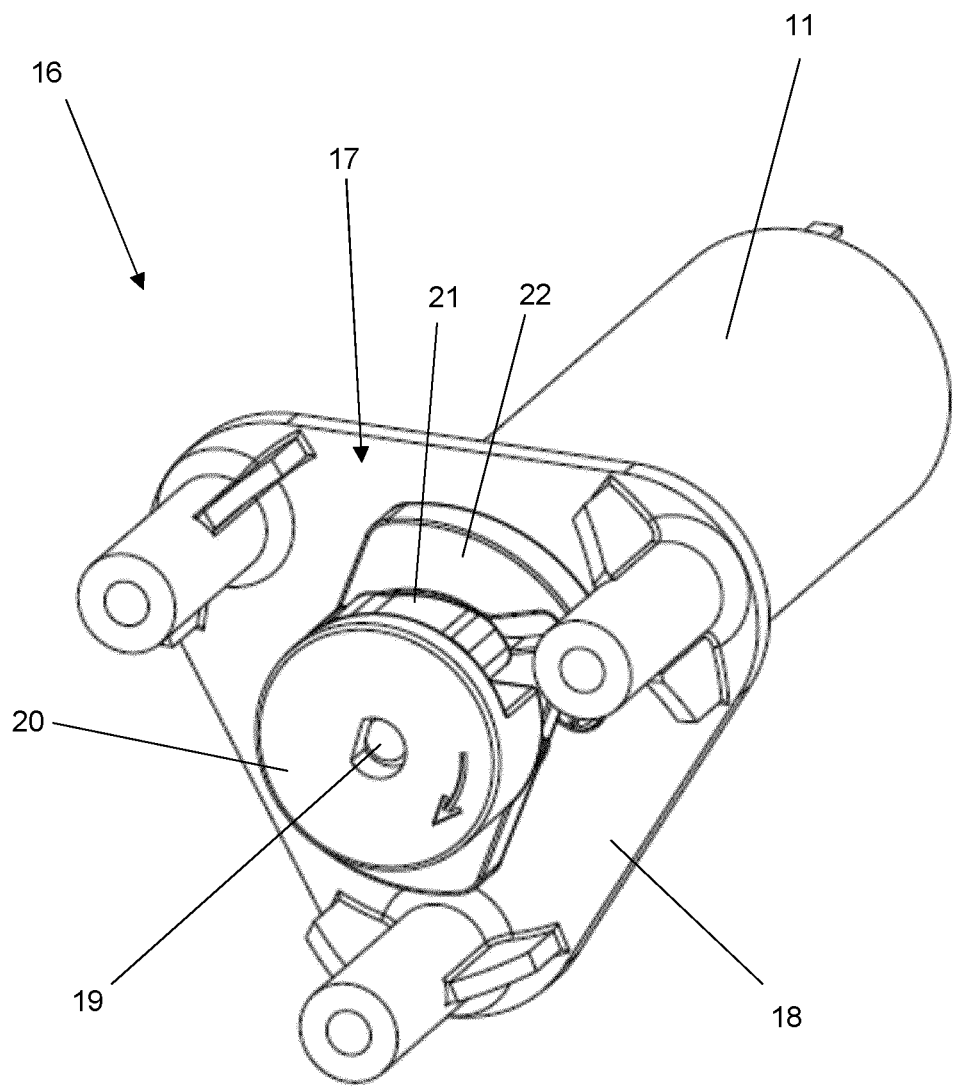
FIG. 4 is a schematic perspective representation of a section of the first clutch of the clutch device according to the invention.

As can be seen, for example, in FIG. 4, the clutch 17 has a motor plate 18 on the drive side, on which motor plate the motor unit 11 is arranged, for example by screwing. The motor unit 11 has a motor shaft 19 which projects through a corresponding opening in the motor plate 18. A rotary part 20 is arranged on the motor shaft 19 in a rotationally fixed manner. During operation of the motor unit 11, said rotary part rotates in correspondence with a rotating movement of the motor shaft 19.

Figure 5:
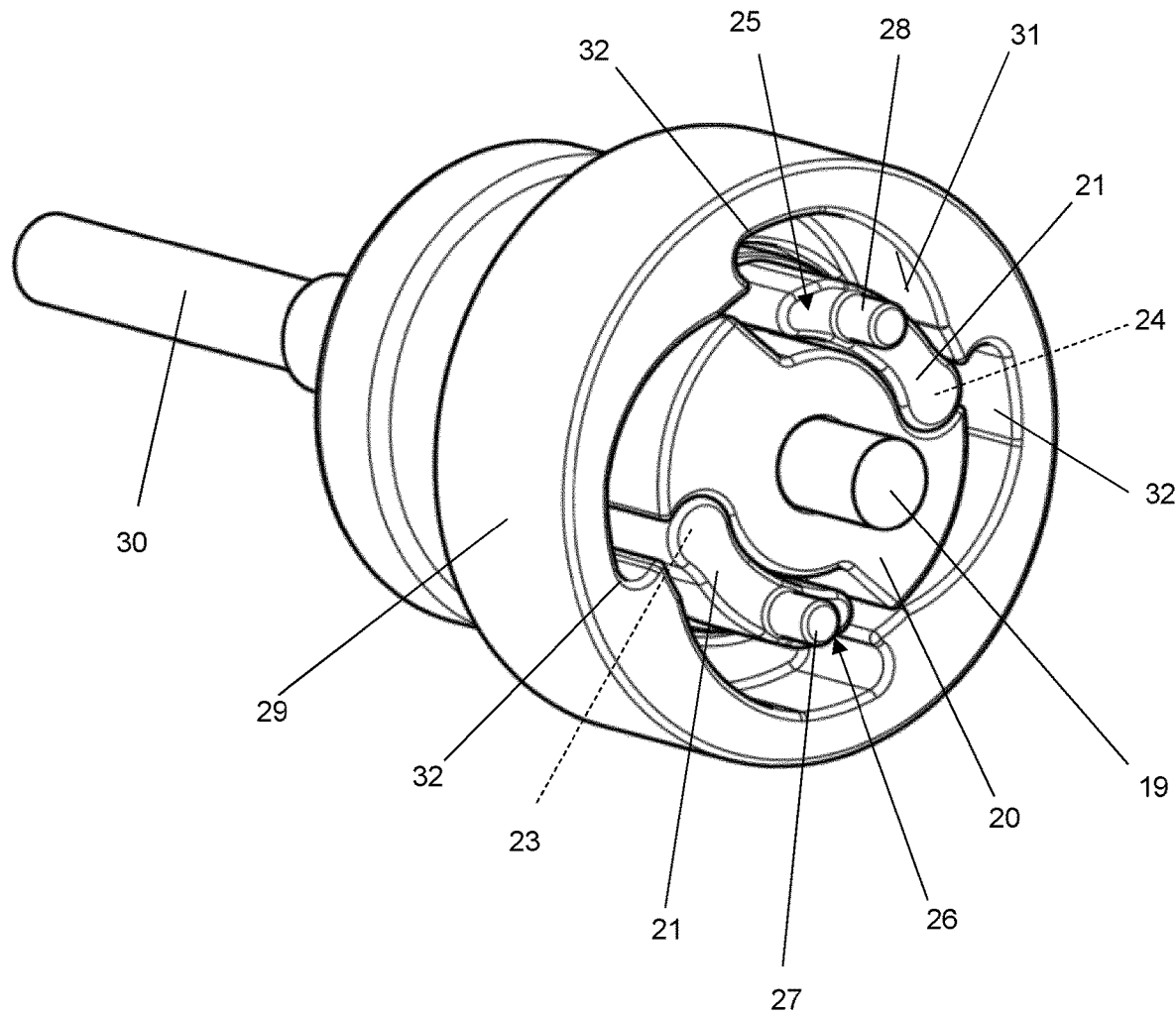
FIG. 5 is a schematic perspective view of a section of the first clutch of the clutch device according to the invention.

FIG. 5 shows a rear view of the rotary part 20. As can be seen from this representation, two clamping pieces 21 are arranged on the rotary part 20 and can be rotated. In this case, on the rotary part 20, one clamping piece 21 is arranged so as to be pivotable about a pivot axis 23, and the other clamping piece 21 is arranged so as to be pivotable about a pivot axis 24, in each case relative to the rotary part 20. Instead of the two clamping pieces 21 shown, more clamping pieces 21 can alternatively also be provided.

Figure 6:
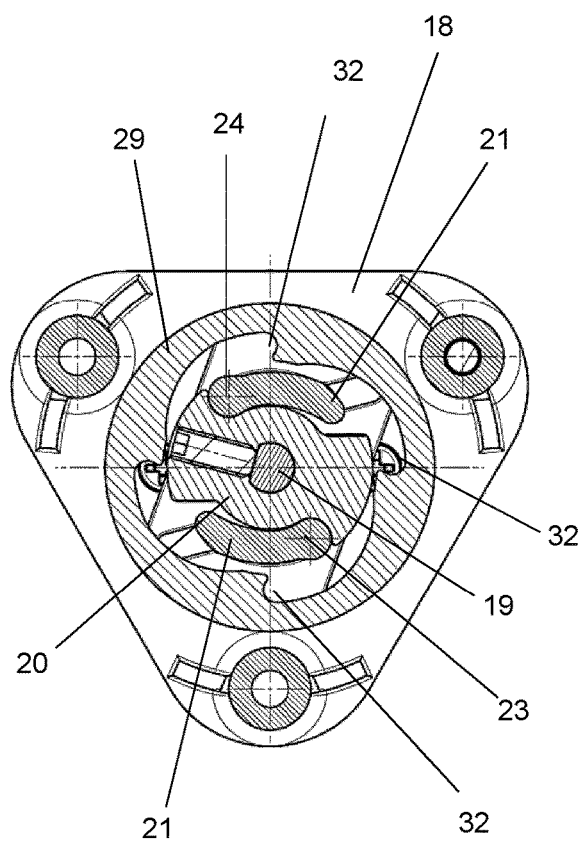
FIG. 6 is a partially sectional top view of the first clutch of the clutch device according to the invention.
Figure 7:
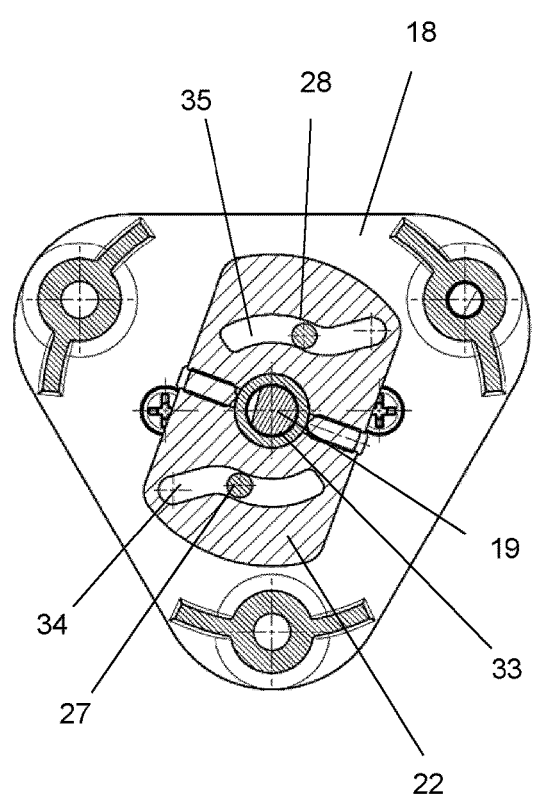
FIG. 7 is a further partially sectional top view of the clutch according to FIG. 6.
Figure 8:
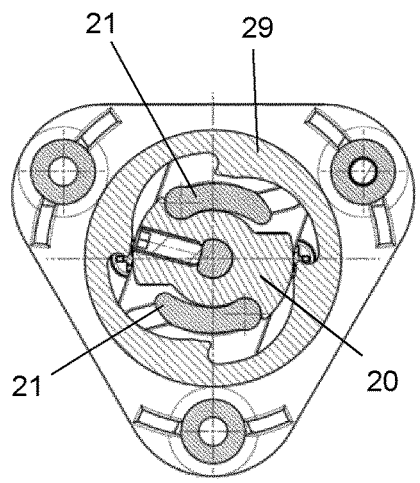
FIG. 8 is a partially sectional view of the first clutch in a first position.
Figure 9:
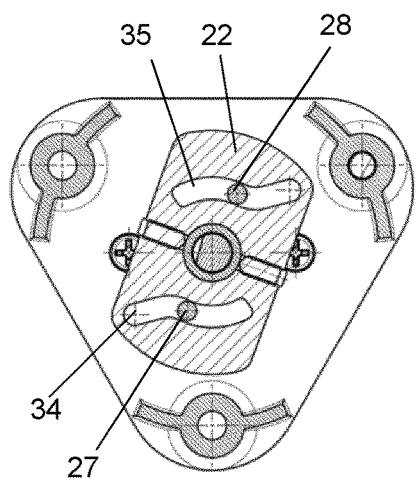
FIG. 9 is a further partially sectional view of the clutch in the position according to FIG. 8.

As can be seen in particular from a synopsis of FIGS. 4, 6 and 7, the clutch 17 also has a guide means 22. Said guide means provides two link guides 34 and 35.

The clamping pieces 21 of the rotary part 20 each have pins 27 and 28 which are arranged in the corresponding end portion 25 and 26 remote from the pivot axis, as can be seen in particular from the representation of FIG. 5. When the clutch 17 is in the assembled state, these pins 27 and 28, respectively, engage with the associated guide links 34 and 35, as can be seen in particular in FIG. 7.

The guide means 22 is rotatably mounted on a bearing collar 33 through which the motor shaft 19 projects, with the formation of a friction fit. A rotating movement of the guide means 22 therefore only takes place when such a rotating force acts on the guide means 22, which force exceeds the friction existing between the guide means 22 and the bearing collar 33 or the frictional force caused by said friction.

FIG. 5 also shows that the clutch 17 has a clutch housing 29. This clutch housing 29 receives the rotary part 20 with the clamping pieces 21 arranged thereon.

The clutch housing 29 provides an inner contour 31 which interacts with the clamping pieces 21. The inner contour 31 has receiving troughs 32 designed to correspond to the end portions 25 and 26 of the clamping pieces 21, which end portions are remote from the pivot axis. As will be described in more detail below, the clamping pieces 21 can dip into these receiving troughs 32.

On the driven side, a driven shaft 30 is arranged on the clutch housing 29, as can also be seen in FIG. 5. Said driven shaft 30 is in operative connection with the drive means, such as the cord drum 13.

The mode of operation of the clutch 17 described above can be seen from a synopsis of FIGS. 8 to 17.

FIGS. 8, 9 and 14 and 15 show the clutch 17 in the disengaged, i.e. released, position. In this position, the clutch housing 29 can rotate freely relative to the rotary part 20. In this position of the clutch 17, manual actuation of the appliance door 5 takes place. The appliance door 5 can be both opened and closed. During a manual movement of the appliance door, the operative connection between the clutch housing 29 and the drive means, for example the cord drum 13, causes the clutch housing 29 to rotate in relation to the rotary part 20.

If the appliance door 5 is in the open position and the appliance door 5 is to be closed by means of the motor unit 11, the motor unit 11 must be started by the user. As a result of a start of the motor unit 11, the motor shaft 19 rotates and thus also the rotary part 20 which is attached thereon in a rotationally fixed manner. As a result of a rotating movement of the rotary part 20, the clamping pieces 21 also rotate together with the rotary part, i.e. about the axis of rotation provided by the motor shaft 19.

Figure 10:
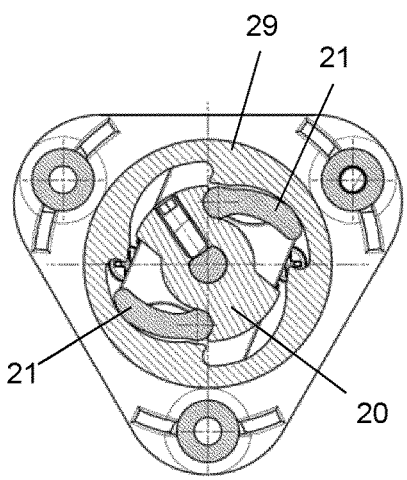
FIG. 10 is a partially sectional view of the first clutch in a second position.
Figure 11:
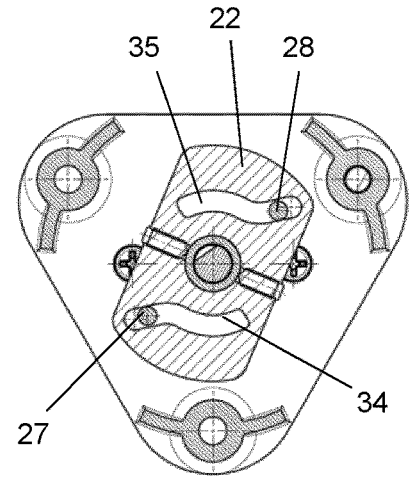
FIG. 11 is a further partially sectional view of the clutch in the position according to FIG. 10.
Figure 12:
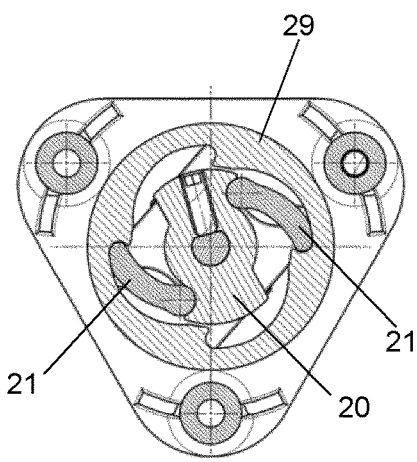
FIG. 12 is a partially sectional view of the first clutch in a third position.
Figure 13:
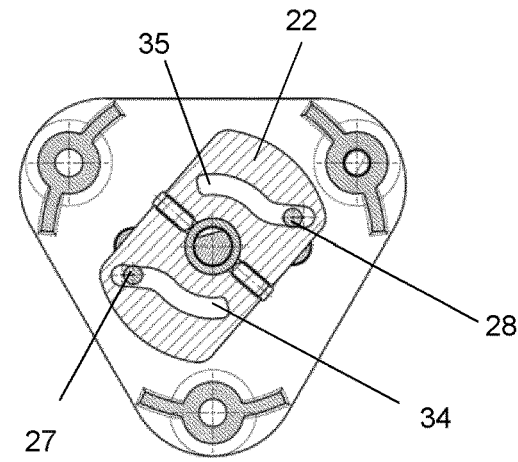
FIG. 13 is a further partially sectional view of the first clutch in the position according to FIG. 12.
Figure 14:
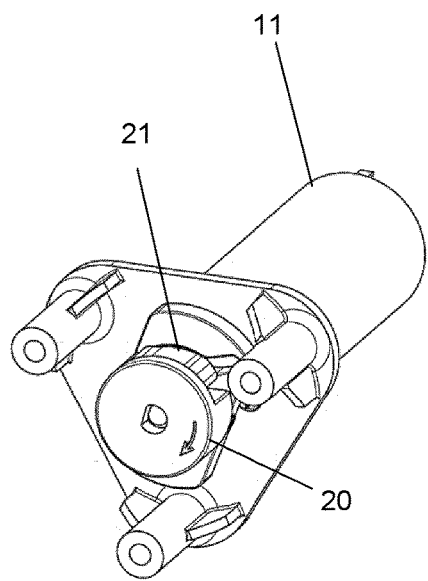
FIG. 14 is a schematic perspective representation of the first clutch in a first position.
Figure 15:
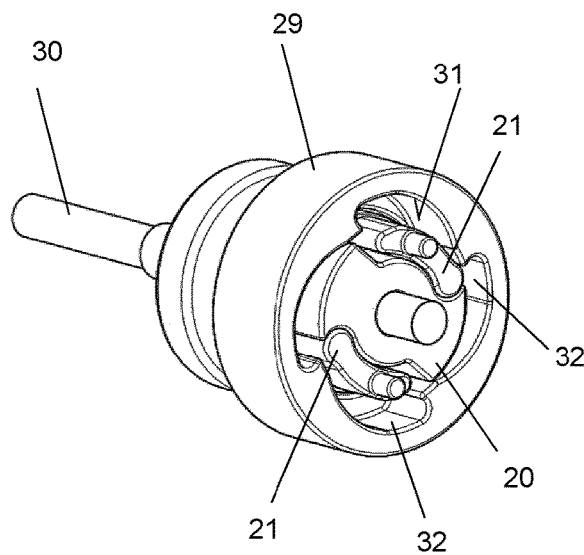
FIG. 15 is a further perspective representation of the first clutch in the position according to FIG. 14.
Figure 16:
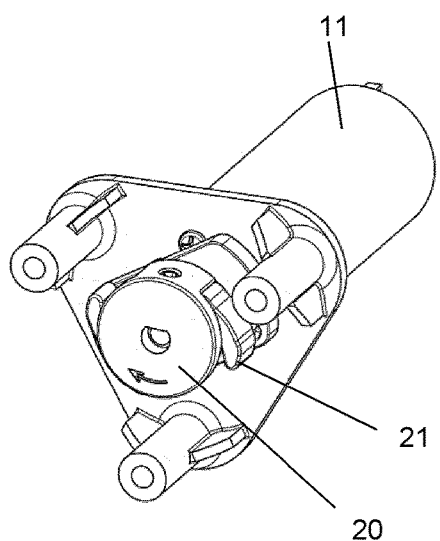
FIG. 16 is a schematic perspective representation of the first clutch in a second position.
Figure 17:
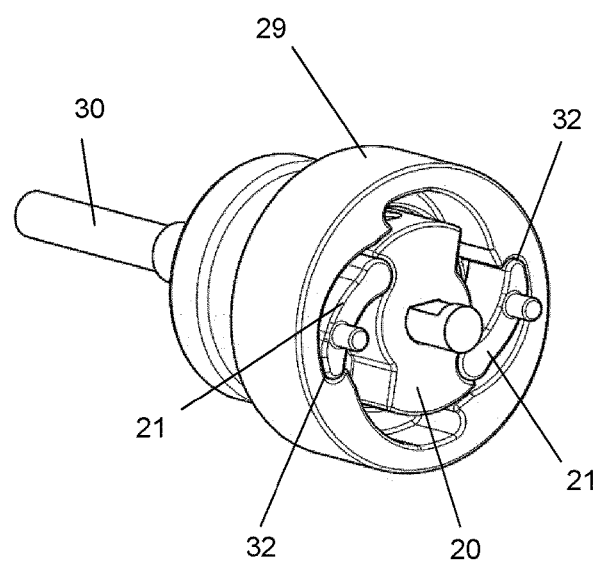
FIG. 17 is a further perspective view of the first clutch in the position according to FIG. 16.

Since the clamping pieces 21 are held with their end portions 25 and 26, which are remote from the pivot axis, in each case with the interposition of the respective pins 27 and 28 in the link guides 34 and 35 of the guide means 22, the corresponding rotating movement of the clamping pieces 21 is achieved by the rotating movement of the rotary part 20, namely relative to the rotary part 20 about the respective axes of rotation 23 and 24. FIGS. 10 and 11 show this factual connection. During this start-up process, the guide means 22 does not rotate, since it is still held stationary on the bearing collar 33 due to the friction fit thereof.

As soon as the clamping pieces 21 have reached their rotated end position in relation to the rotary part 20, they engage with their end portions 25 and 26 with corresponding receiving troughs 32 of the inner contour 31 of the clutch housing 29, as can be seen in FIGS. 12 and 13 or 16 and 17. In this position, a force-transmitting coupling between the rotary part 20 and the clutch housing 29 is achieved. The clutch 17 is therefore coupled or engaged, so that torque transmission can take place from the motor-driven rotary part 20 to the clutch housing 29 and thus to the driven shaft 30. As a result, the cord drum 13 or the gear wheel 48 rotates in a motor-driven manner, with the effect that the appliance door 5 closes in a motor-driven manner.

A particular advantage of the construction described above is that no special actuators are required for engaging the clutch 17. The clutch is engaged automatically when the motor unit 11 starts operating. As soon as the motor unit 11 starts, a rotating movement of the rotary part 20 takes place in the manner described above, which then results in a form-fitting engagement of the clamping pieces 21 with the associated receiving troughs 32.

Another advantage of the clutch 17 described above is that the appliance door can still be moved manually, i.e., the appliance door 5 can still be pushed by the user. This is because, if the appliance door 5 is manually moved despite the motor operation, the clutch housing 29 rotates clockwise faster than the motor-driven rotary part 20 as a result of the manual intervention. As a consequence, the clamping pieces 21 are released from the respectively associated receiving troughs 32. An additional force or torque loading of the clutch 17 or the motor unit 11 by manually pushing the appliance door 5 is thus prevented. If manual assistance is then no longer provided, the clamping pieces 31 again engage with the respectively associated receiving troughs 32, so that a continued motor operation can take place.

Figure 18:
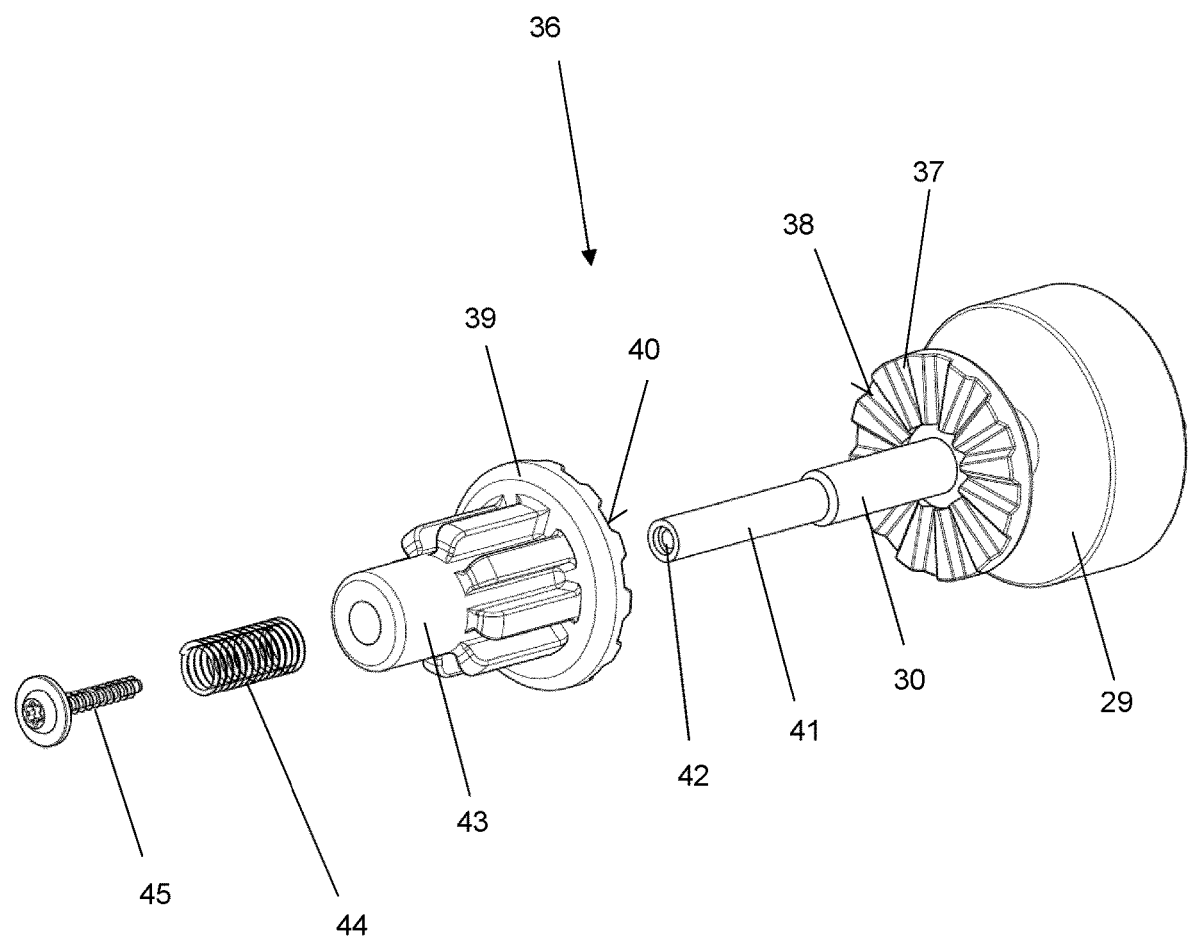
FIG. 18 is a schematic exploded representation of the second clutch of the clutch device according to the invention.
Figure 19:
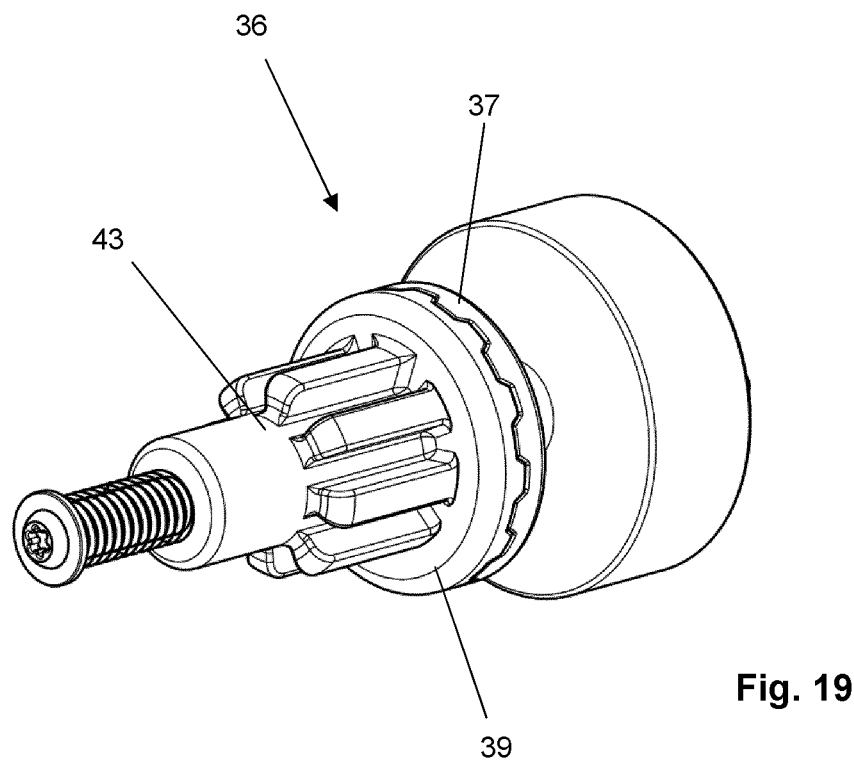
FIG. 19 is a schematic perspective representation of the second clutch in a first position.
Figure 20:
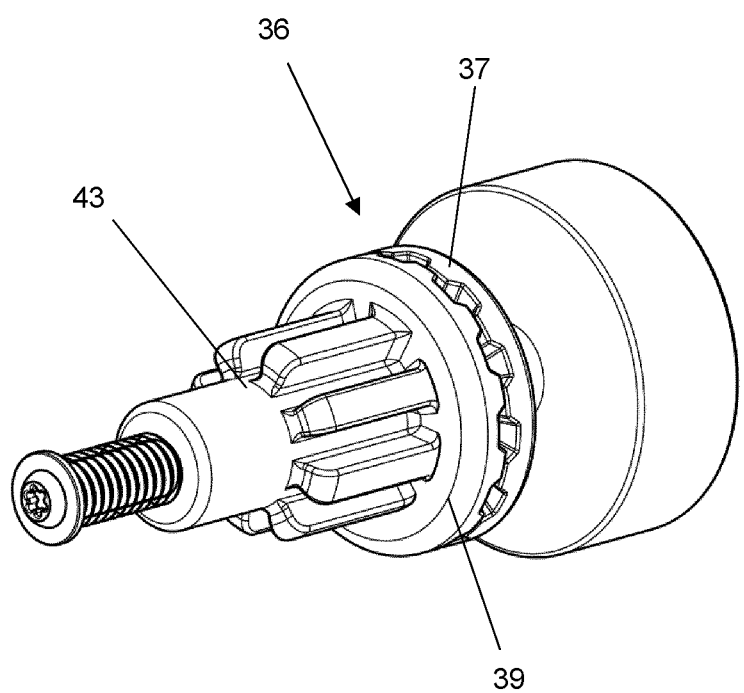
FIG. 20 is a schematic perspective representation of the second clutch in a second position.

The clutch device 16 preferably has a second clutch in the form of a claw clutch 36, as can be seen from a synopsis of FIGS. 18 to 20. The claw clutch 36 serves as a slip clutch and is intended to ensure a mechanical interruption of the drive train, in particular in the event of a door blockage.

The claw clutch 36 has a first clutch part 37 and a second clutch part 39 which each provide corresponding active surfaces 38 and 40. The first clutch part 37 is arranged on the drive shaft 30 in a rotationally fixed manner During a rotating movement of the clutch housing 29, the first clutch part 37 of the claw clutch 36 also rotates.

A toothed part 43 is rotatably mounted on the driven shaft 30 and forms the second clutch part 39 designed in one piece therewith.

Connected to the driven shaft 30 is a sleeve extension 41 which provides a threaded bore 42 on the face side. In the final assembled state, a screw 45 engages in this threaded bore 42, on which screw a spring 44 pressing against the toothed part 43 is supported.

In normal operation, the active surfaces 38 and 40 of the clutch parts 37 and 39 engage with one another, as shown in FIG. 19. In this case, the toothed part 43 providing the second clutch part 39 is under spring preload and is therefore pressed against the first clutch part 37.

The toothed part 43 serves either itself as a cord drum 13 for receiving the cord 14 or as a gear wheel 48 for receiving the toothed belt 14', or as a coupling element for receiving a separately designed cord drum 13 or a separately designed gear wheel 48. In any case, when the appliance door 5 is blocked, a counterforce acts on the toothed part 43 via the cord 14 or the toothed belt 14'. If this counterforce is greater than the compression force of the two clutch parts 37 and 39 provided by the spring 44, the claw clutch 36 slips, in that the clutch parts 37 and 39 disengage, as shown in FIG. 20. The driven train between the motor unit 11 and the cord drum 13 or gear wheel 48 is interrupted so that, despite operation of the motor unit 11, a rotating movement of the cord drum 13 or gear wheel 48 does not occur.

Figure 21:
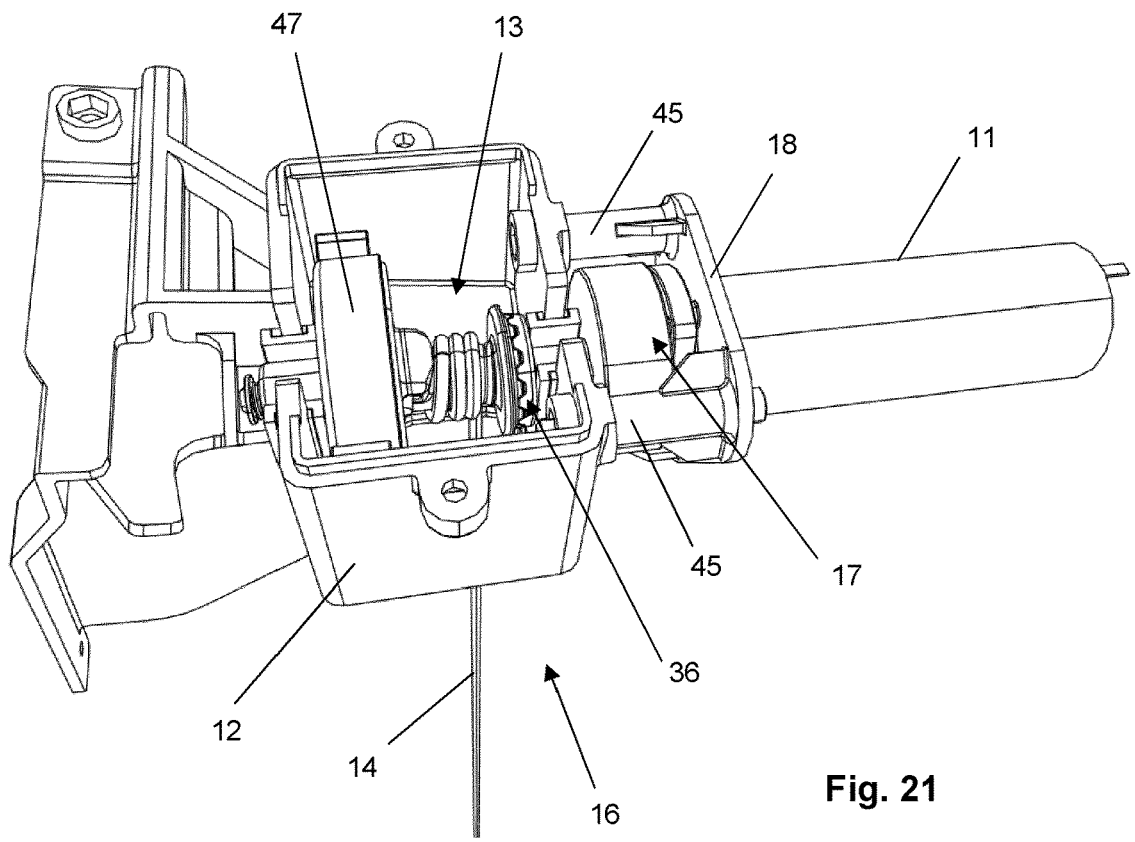
FIG. 21 is a schematic perspective representation of the clutch device according to the invention in an assembly situation and FIG. 22 is a schematic perspective representation of the clutch device according to FIG. 21 without the housing.
Figure 22:
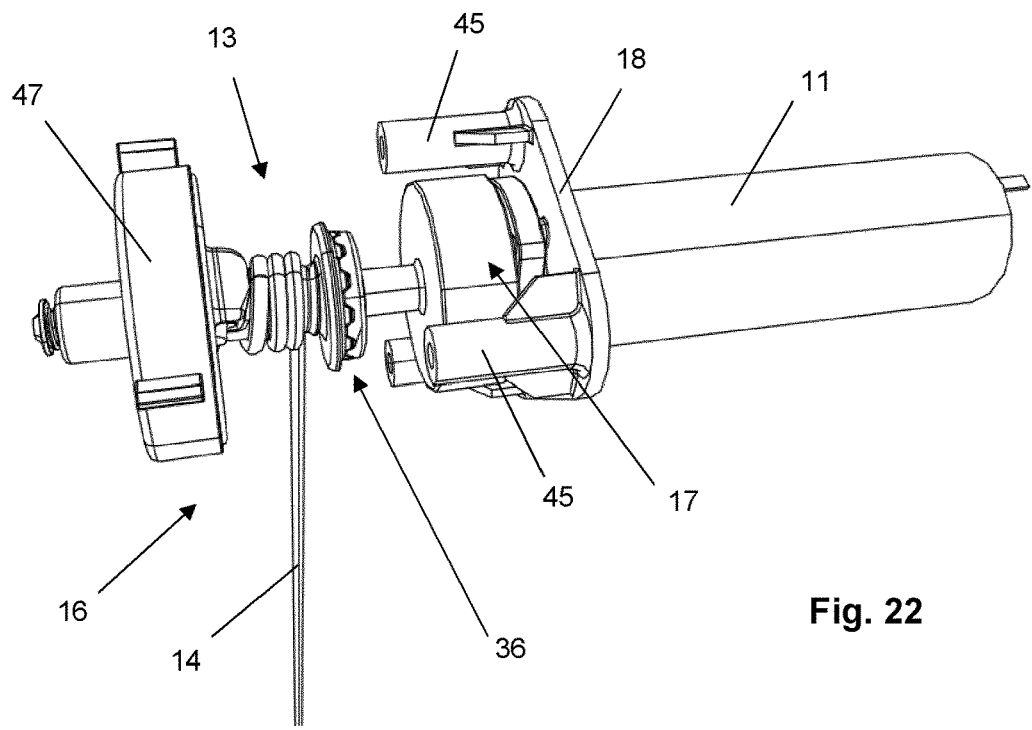

FIGS. 21 and 22 show the clutch device 16 according to the invention in the assembled state and in particular in interaction with a cord drum 13 and a cord 14 according to the embodiment according to FIGS. 1 and 2, with FIG. 21 also showing the housing 12 which is not shown in FIG. 22 for the sake of a better overview.

The motor plate 18 carrying the motor unit 11 is arranged on the outside of the housing 12 with the interposition of corresponding mandrels 45. The first clutch 17 extends on the driven side between the motor plate 18 and the housing 12. Both the second clutch 36, which is adjacent to the first clutch 17 on the driven side, as well as the cord drum 13 are arranged inside the housing 12. The cord drum 13 interacts with a resiliently sprung tensioning means 47 which, in particular in the case of a manual door closure, ensures that the cord drum 13 rotates in order to wind up the cord 14.

If the motor unit 11 is in operation, the clutch 17 is automatically engaged in the manner already described, so that the motor torque is transmitted to the cord drum 13 for winding up the cord 14. In the event of a blockage of the appliance door 5, the drive train is mechanically interrupted as a result of the claw clutch 36 slipping.

At the end of the movement, the motor of the motor unit is switched off and briefly operated in the opposite direction of rotation. As a result, the clamping pieces 21 disengage from the respectively associated receiving troughs 32 and finally remain in the fully retracted position.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1. Dishwasher
2. Appliance housing
3. Appliance compartment
4. Loading opening
5. Appliance door
6. Lever
7. Cord
8. Deflection roller
9. Deflection roller
10. Metal sheet
11. Motor unit
12. Housing
13. Cord drum
14. Cord; 14' Toothed belt
15. Deflection roller
16. Clutch device
17. Clutch
18. Motor plate
19. Motor shaft
20. Rotary part
21. Clamping piece
22. Guide means
23. Pivot axis
24. Pivot axis
25. End portion
26. End portion
27. Pin
28. Pin
29. Clutch housing
30. Driven shaft
31. Inner contour
32. Receiving trough
33. Bearing collar
34. Link guide
35. Link guide
36. Claw clutch
37. First clutch part
38. Active surface
39. Second clutch part
40. Active surface
41. Sleeve extension
42. Threaded bore
43. Toothed part
44. Spring
45. Screw
46. Tab
47. Tensioning means
48. Gear wheel
49. Spring mechanism
50. Spring element

The invention claimed is:

1. A domestic appliance, comprising:
an appliance housing which provides an appliance compartment and has a loading opening for access to the appliance compartment;
an appliance door mounted so as to be rotatable about a pivot axis for closing the loading opening;
a motor unit in operative connection with the appliance door and by which the appliance door is transferrable from an open position to a closed position closing the loading opening; and
a clutch device arranged between the motor unit and the appliance door and in operative connection with the motor unit on a drive side thereof and with the appliance door on a driven side thereof,
wherein the clutch device has a clutch which is configured to be switchable and transferrable from a disengaged position to an engaged position and vice versa, the clutch being configured to cause an automatic switching from the disengaged position to the engaged position during operation of the motor unit, and wherein the clutch has a rotary part which is arranged on a motor shaft of the motor unit in a rotationally fixed manner and which carries a clamping piece arranged thereon so as to be rotatable about a pivot axis.

2. The domestic appliance of claim 1, wherein the operative connection between the motor unit and the appliance door has a force transmission means comprising a cord.

3. The domestic appliance of claim 2, wherein the cord is arranged at one end on a lever of the appliance door.

4. The domestic appliance of claim 3, wherein the cord is arranged at an other end on a rotatably mounted cord drum onto which the cord is at least partially windable.

5. The domestic appliance of claim 1, wherein the motor unit is in operative connection with a drive means comprising a cord drum via the clutch device to cause the cord drum to rotate during operation of the motor unit.

6. The domestic appliance of claim 1, wherein the clutch device has a second clutch comprising an overload clutch.

7. The domestic appliance of claim 6, wherein the second clutch comprises a claw clutch.

8. The domestic appliance of claim 6, wherein the second clutch has a first clutch part and a second clutch part, the second clutch part bearing against the first clutch part under spring preload.

9. The domestic appliance of claim 8, wherein the first clutch part is arranged on a driven shaft of the first clutch in a rotationally fixed manner.

10. The domestic appliance of claim 1, wherein the domestic appliance comprises a water-conducting domestic appliance.

11. The domestic appliance of claim 1, wherein the clamping piece, with an end portion remote from the pivot axis, interacts with a link guide provided by a guide means.

12. The domestic appliance of claim 11, wherein the guide means is rotatably mounted on a bearing collar through which the motor shaft passes, forming a friction fit.

13. The domestic appliance of claim 1, wherein the clutch has a clutch housing which at least partially receives the rotary part and has an inner contour interacting with the clamping piece.

14. The domestic appliance of claim 13, wherein the inner contour has a receiving trough configured to correspond to an end portion of the clamping piece remote from the pivot axis.

15. The domestic appliance of claim 13, wherein the clutch housing provides a driven shaft.

* * * * *